US005667850A

United States Patent [19]

Gaven et al.

[11] Patent Number: 5,667,850

[45] Date of Patent: Sep. 16, 1997

[54] METHOD OF CURING WITH ULTRAVIOLET RADIATION ON SUBSTRATES REQUIRING LOW HEAT

[75] Inventors: Thomas J. Gaven, Summit; Dario V. Bravar, Lodi, both of N.J.

[73] Assignee: Gavenco, LLC, Newark, N.J.

[21] Appl. No.: 726,084

[22] Filed: Oct. 4, 1996

[51] Int. Cl.[6] .......... C08J 7/04

[52] U.S. Cl. .......... 427/510; 118/45; 118/46; 118/68; 118/69; 118/641; 118/666; 427/207.1; 427/256; 427/385.5; 427/398.1; 427/516; 427/558; 427/559

[58] Field of Search .......... 427/510, 207.1, 427/256, 385.5, 398.1, 516, 558, 559; 118/45, 46, 68, 69, 641, 666

*Primary Examiner*—Bernard Pianalto

*Attorney, Agent, or Firm*—Kenneth P. Glynn, Esq.

[57] ABSTRACT

A method is for curing ultraviolet light-curable coatings, inks or adhesives on heat sensitive substrates, wherein the substrates are coated and then passed under ultraviolet light. It includes reducing the temperatures of the substrates while being passed under the ultraviolet light by providing a shield at a location between the ultraviolet light and the substrates. The shield is substantially infrared light reflective and absorptive to prevent infrared light from reaching the substrates and is also substantially ultraviolet light permeable to permit ultraviolet light to reach the substrates. An ultraviolet light curing device utilizing the aforesaid shield is also described for curing ultraviolet light-curable coatings, printings and adhesives on heat sensitive substrates.

10 Claims, 3 Drawing Sheets

METHOD OF CURING WITH ULTRAVIOLET RADIATION ON SUBSTRATES REQUIRING LOW HEAT

BACKGROUND OF THE INVENTION

1. Field of the Invention

The present invention relates to the curing of coated substrates which deform at elevated temperatures, and more particularly, to methods and devices for ultraviolet radiation curing of such coated substrates at lower temperatures than previously utilized.

2. Information Disclosure Statement

UV curable inks, adhesive and coatings are finding increasing use in the printing industry. The UV lamps used to cure these inks produce considerable energy in the visible and infrared spectra. This can cause the substrate which is being printed upon to reach a high temperature even when moving at high speed. This temperature will deform thin substrates, such as plastic sheets, plastic foils or styrene cups. When the press is stopped, the UV light must be shuttered so it does not burn the substrate.

The present invention reduces the temperature during printing and eliminates the need for a shutter on the ultraviolet curing equipment when the substrate is stopped under the lamps. In the present invention device and method, a shield, e.g. a heat absorbing glass with an IR reflective coating applied to one side, is placed between the UV lamp and the coated substrate. The present invention shield transmits the needed UV energy.

Typically the UV energy in the 360 nm region from a 300 watt/inch Hg vapor lamp is 800 mw/cm$^2$. The temperature of the substrate under the lamp would exceed 250° C. (482° F.), if not shuttered. Using the present invention, the UV energy will be reduced to about 600 mw/cm$^2$, but the temperature will be below 100° F. (If required, the power into the lamp may be increased to 350 watts/inch to restore the UV to 800 mw/cm$^2$ with a temperature of about 110° F.) At reduced temperatures, achieved by the present invention, even the thinnest substrate can be stopped under the ultraviolet lamp without the need to interpose a mechanical shutter between the lamp and substrate. When a shutter is used, it is usual to reduce the power in the lamp so the shutter does not distort. These problems are eliminated with the present invention devices and methods. The power can still be reduced when using the present invention shield and the coated substrates will be only a few degrees above ambient.

In the instance stated, the prior art systems have the problem that the power cannot be reduced below about 100 watts/inch or the lamp will go out and at 100 watts/inch, the temperature is still too hot for most substrates when stationary under the lamp, which is why the shutter is needed. If the lamp were turned off, it takes too long to cool down to restart, e.g., about five minutes. While a microwave excited lamp warms up in seconds, the microwave lamps also produce too much heat for curing these coated substrates.

Notwithstanding the above prior art, there are no teachings or suggestions that would render the present invention anticipated or obvious.

SUMMARY OF THE INVENTION

A method is described for curing ultraviolet light-curable coatings on heat deformable substrates, wherein the substrates are coated and then passed under ultraviolet light. It includes reducing the temperatures of the substrates while being passed under the ultraviolet light by providing a shield at a location between the ultraviolet light and the substrates, the shield is substantially infrared light reflective and absorptive to prevent infrared light from reaching said substrates and is also substantially ultraviolet light permeable to permit ultraviolet light to reach the substrates. An ultraviolet light curing device is also described for curing ultraviolet light-curable coatings on heat deformable substrates. It includes a frame, at least one ultraviolet light source attached to said frame, a rear reflector located behind the back of the ultraviolet light source for diverting light toward a substrate positioner. The reflective surface can be shaped to provide focused or nonfocused radiation. It can be dichroically coated to further enhance the UV to IR ratio on the substrate. There is also an optional front reflector attached to the frame located in front of said at least one ultraviolet light source, said front reflector being smaller in size than said rear reflector and positioned for reflecting light which illuminates from the front of the at least one ultraviolet light source back to said rear reflector. A substrate positioner attached to the frame and located in front of the front reflector at a predetermined distance from the at least one ultraviolet light source for positioning a coated substrate for efficient ultraviolet light curing. A shield located between the front reflector and the substrate positioning means, on the surface and infrared, the shield is substantially infrared light reflective absorbing through its thickness to prevent infrared light from reaching the substrate positioning means, and is substantially ultraviolet light permeable to permit ultraviolet light to reach the substrate positioning means, the shield is located a predetermined distance from the at least one ultraviolet light source. A power source and control means connected to the at least one ultraviolet light source for functional operation thereof.

BRIEF DESCRIPTION OF THE DRAWINGS

The present invention will be more fully understood when the specification herein is taken in conjunction with the drawings appended hereto, wherein.

DETAILED DESCRIPTION OF THE PRESENT INVENTION

Figure 1:
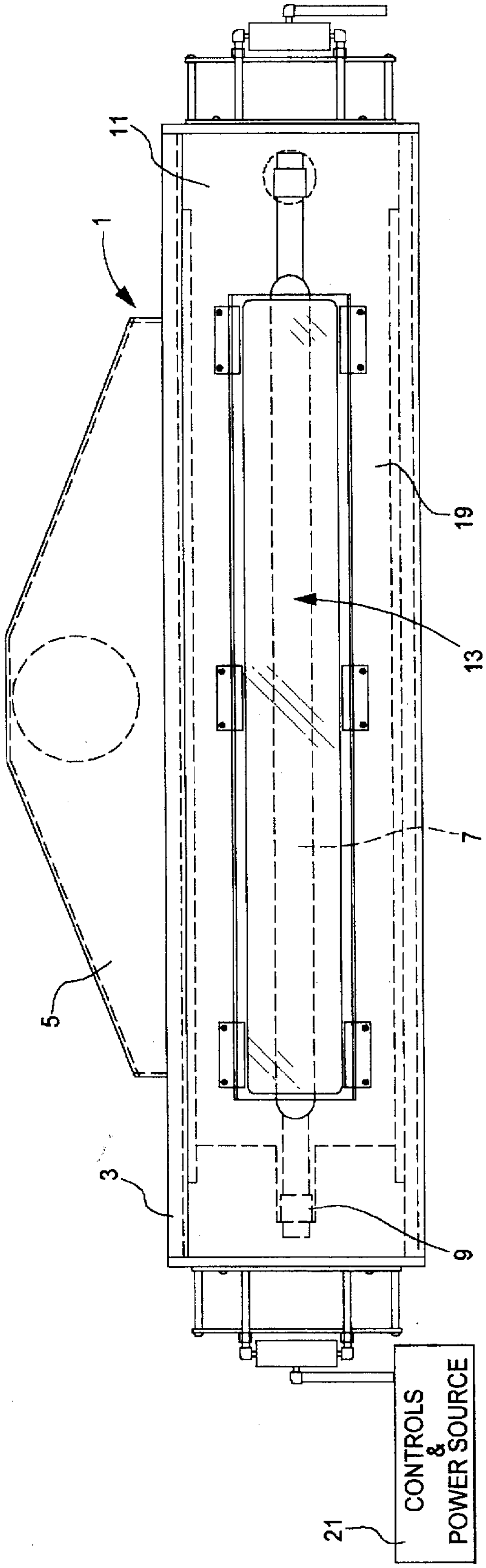
FIG. 1 is a cut top view of a present invention ultraviolet light curing device and FIG. 2 is a side cut view thereof.
Figure 2:
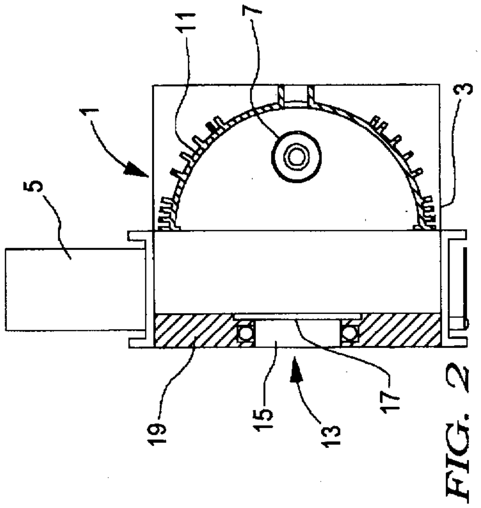

The present invention device and method may be appreciated by reference to FIG. 1 and 2. In FIG. 1 and 2, present invention ultra violet curing device 1 includes a frame 3. This frame 3 actually consists of the structural supporting hardware and related fixtures for wiring, control boxes, etc. which would generally be utilized in ultra violet curing devices which are currently used in commercial operations. Additionally, frame 3 would include means for holding an ultraviolet lamp and other features of the present invention. It should be noted that FIGS. 1 and 2 show present invention ultraviolet curing device 1 without including means for holding a substrate. Such means for holding a substrate would inherently be used in any existing system and these may be carriers for cups, mandrills, converser belts, robotics, or other conventional mechanism used to move substrate from one point to another and including along the path, exposure to an ultra violet curing device.

In this embodiment, frame 3 includes an air circulation system 5 and has contained therein an ultra violet light lamp 7 with electrodes 9. There is a reflector 11 and a present invention shield 13. The frame front 19 is adapted to receive shield 13, as shown.

Figure 3:
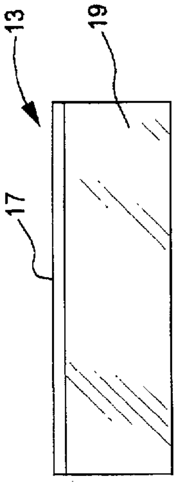
FIG. 3 is an enlarged end view with a shield shown in FIGS. 1 and 2.

As shown in the side cut view FIG. 2 along line A is frame front 19 with present invention shield 13, which includes absorption glass 15 and shield dichroic infrared light reflective coating 17. An end view and larger dimensions of shield 13 is shown in FIG. 3 and the parts are identically numbered.

Figure 4:
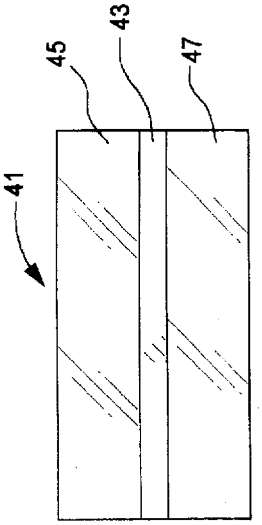
FIG. 4 illustrates an end view of a sandwiched shield which may be utilized in present invention devices.

FIG. 4 shows a sandwiched type present invention shield generally shown as shield 41. This sandwiched shield 41 includes heat absorbing glass layer 45 and heat absorbing glass layer 47 with a dichroic infrared light reflective layer 43. This layer 43 may be a coated layer, may be a sheet layer or foil layer or other physical arrangement which may be purview of the artisan.

Figure 5:
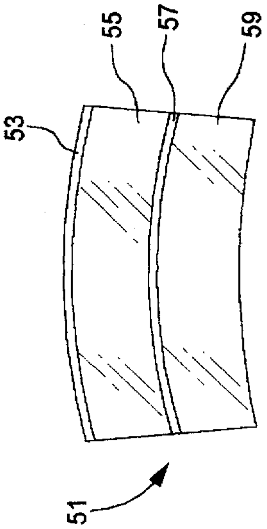
FIG. 5 shows a multi-layer arcuate shield which may be used in present invention devices.

FIG. 5 shows yet another sandwiched shield of the present invention. Here sandwiched arcuate shield 51 includes dichroic infrared light reflective layer 53, heat absorbing glass layer 55, dichroic infrared light reflective layer 57 and heat absorbing glass layer 59. Not only is this shield 51 designed to include two light reflective layers 53 and 57, but it is curved or arcuate so as to work somewhat like a concentrating or concave lens to work towards assisting in the direction of the ultraviolet light which passes there through for curing.

Figure 6:
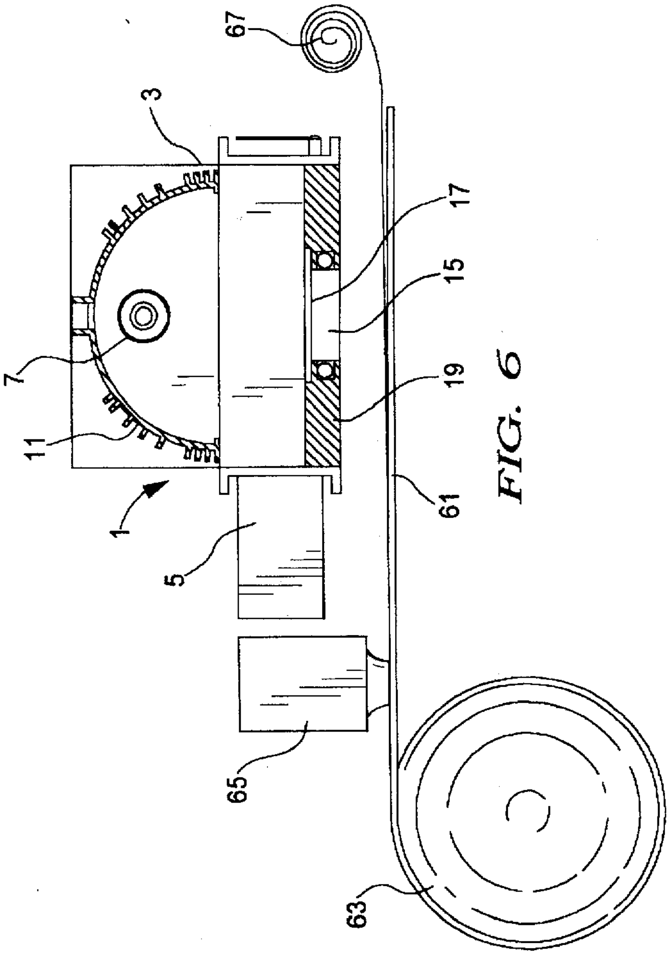
FIG. 6 illustrates a cut view of the device shown in FIGS. 1 and 2 in operation with a flexible coated continuous operation substrate; and, FIG. 7 is a chart showing level of light for various wave lengths on a relative scale using the present invention device shown in FIG. 1 and FIG. 2.

FIG. 6 shows a side view with an end cut of present invention ultraviolet curing device 1 which is shown in FIG. 1, along with some of the other features which would be used in one embodiment of the present invention. Thus, there is included a role of plastic foil substrate 63 which is moved along substrate support means 61, such as with conveyer belt (not shown) so as to have the plastic foil substrate 63 pass under present invention ultraviolet curing device 1. Print applicator, coding applicator or adhesive dispenser 65 represented by device 65 applies print, a coding or adhesive, respectively, to foil 63 and this coating, ink or adhesive is ultraviolet curable. As the substrate passes under present invention ultraviolet curing device 1, the ultraviolet lamp 7 emits sufficient light to effect curing base on the exposure time and the specific needs for a given ultraviolet curable chemistry roll 67 coils the finished products, that is the coded, cured substrate for subsequent commercial use.

Figure 7:
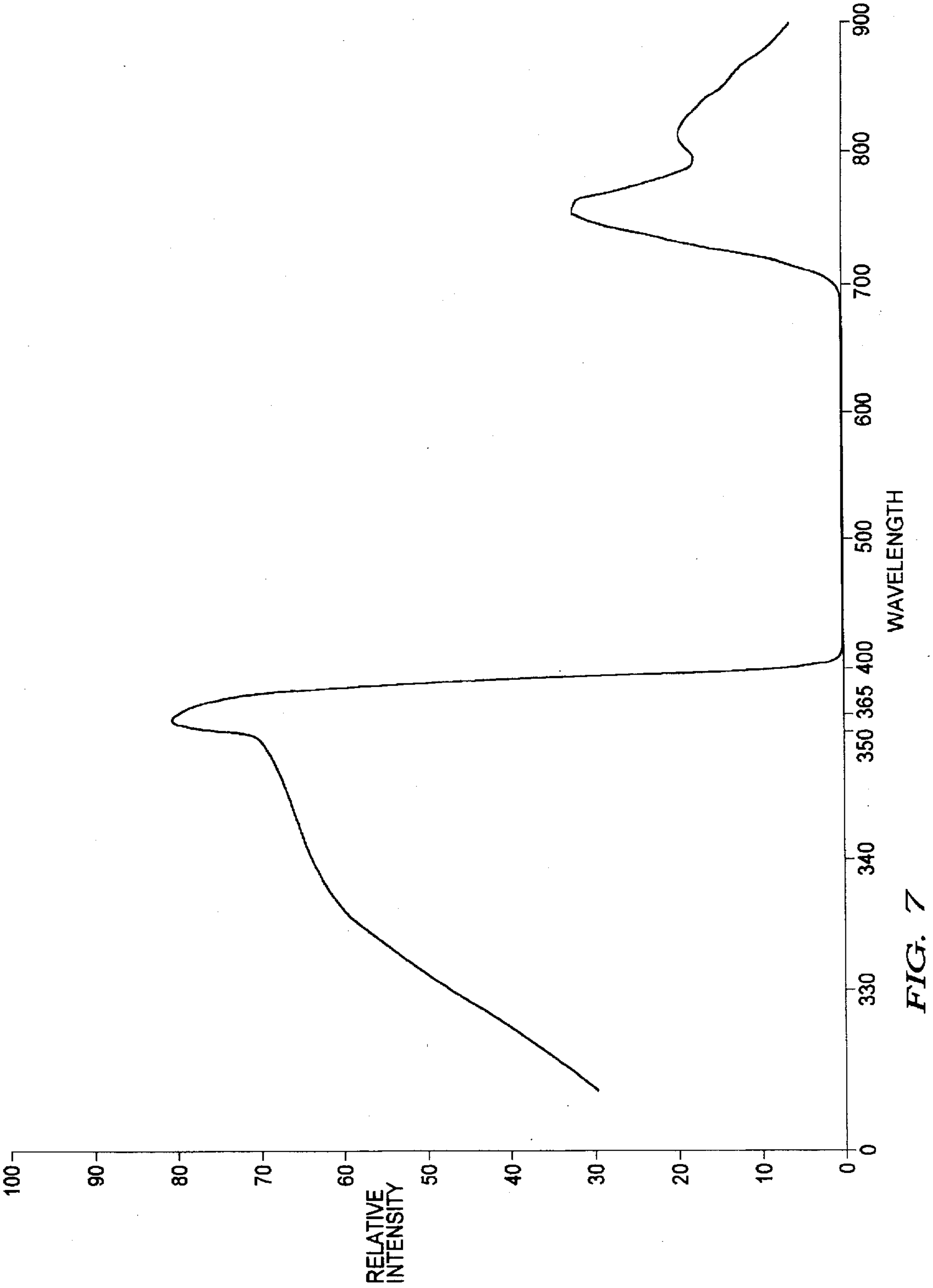

FIG. 7 shows a graph which represents the measurement of relative intensity of light at various wave lengths obtained when utilizing the device shown in FIG. 1 with shield 13. As car be seen, the infrared light is not being transmitted to the area outside of the shield 13.

The shield can be preferably mounted close to the substrate which enables a more narrow shield, which may be a separate piece from the lamp-reflector assembly itself. This enables both the shield and the lamp to be replaced without disassembly of the entire unit.

Obviously, numerous modifications and variations of the present invention are possible in light of the above teachings. It is therefore understood that within the scope of the appended claims, the invention may be practiced otherwise than as specifically described herein.

What is claimed is:

1. In a method of curing ultraviolet light-curable printings, and adhesives on heat sensitive substrates, wherein said substrates are applied and then passed under ultraviolet light, the improvement which comprises:

reducing the temperatures of said substrates while being passed under said ultraviolet light by providing a shield at a location between said ultraviolet light and said substrates, said shield being substantially infrared light reflective to prevent infrared light from reaching said substrates and also being substantially ultraviolet light transmissive permeable to permit ultraviolet light to reach said substrates.

2. The method of claim 1 including providing said shield wherein said shield is a heat absorbing glass material having an infrared light reflective coating thereon.

3. The method of claim 2 including providing said shield wherein said glass is arcuate in shape to enhance focus of said ultraviolet light.

4. The method of claim 2 wherein said glass is a deep violet colored silica glass.

5. The method of claim 1 including providing said shield wherein said shield is a plurality of layers of materials including at least one infrared light reflective layer and at least two heat absorbing layers.

6. An ultraviolet light curing device for curing ultraviolet light-curable materials on heat sensitive substrates, which comprises:

(a) a frame for supporting at least one ultraviolet light source, reflectors, at least one shield on a substrate positioning means;

(b) at least one ultraviolet light source attached to said frame and having a front and a back;

(c) a rear reflector located behind the back of said at least one ultraviolet light source for diverting light toward a substrate positioning means;

(d) a front reflector attached to said frame and located in front of said at least one ultraviolet light source, said front reflector being smaller in size than said rear reflector and positioned for reflecting light which illuminates from the front of said at least one ultraviolet light source back to said rear reflector;

(e) a substrate positioning means positioned relative to said frame and located in front of said front reflector at a predetermined distance from said at least one ultraviolet light source for positioning a coated substrate for efficient ultraviolet light curing;

(f) a shield located between said front reflector and said substrate positioning means, said shield being substantially infrared light reflective to prevent infrared light from reaching said substrate positioning means, and being substantially ultraviolet light permeable to permit ultraviolet light to reach said substrate positioning means, said shield being located a predetermined distance from said at least one ultraviolet light source; and, (g) a power source and control means connected to said at least one ultraviolet light source for functional operation thereof.

7. The device of claim 6 wherein said shield is a heat absorbing glass with an infrared-reflective dichromic coating.

8. The device of claim 6 wherein said glass is a deep violet colored silicate glass.

9. The device of claim 6 wherein said shield is removably attached to said frame.

10. The device of claim 6 wherein said glass is arcuate in shape to enhance focus of said ultraviolet light.

* * * * *